A. C. TOWNSEND.
BUTTER-DISH.

No. 187,784. Patented Feb. 27, 1877.

Attest:
Almont Barnes
J. L. Gardner

Inventor:
Alice C. Townsend

UNITED STATES PATENT OFFICE.

ALICE C. TOWNSEND, OF BUFFALO, NEW YORK.

IMPROVEMENT IN BUTTER-DISHES.

Specification forming part of Letters Patent No. 187,784, dated February 27, 1877; application filed August 18, 1876.

*To all whom it may concern:*

Be it known that I, ALICE C. TOWNSEND, of Buffalo, in the county of Erie and State of New York, have invented a new and useful Improvement in Butter-Dishes, which improvement is fully set forth in the following specification, reference being had to the accompanying drawings.

The object of my invention is to keep table-butter cool, without contact with ice, by means of a covered butter-dish provided with a removable ice-holder, the cover of the holder being formed to receive the butter, and the bottom perforated for the escape of water into the chamber of the butter-dish below the ice-holder. The ice-holder is shaped so as to fit the inside of the butter-dish, with its upper rim near or at the top of the body of the dish, and rest its lower edge against the inwardly-inclined sides of the dish, far enough from the bottom of said dish to leave a small water-chamber under the ice-holder when the same is in position for use. The top of the ice-holder is also the butter-platform, and is a little convex, and, if the dish is made of metal, may be attached to the body of the holder by a hinge. It has a small hole on the free side opposite the hinge, by means of which the ice-holder may be opened.

The dish, as improved, may be made of any material or composition of which butter-dishes are or may be made.

The invention is illustrated more fully by reference to the accompanying drawing, in which—

Figure 1:
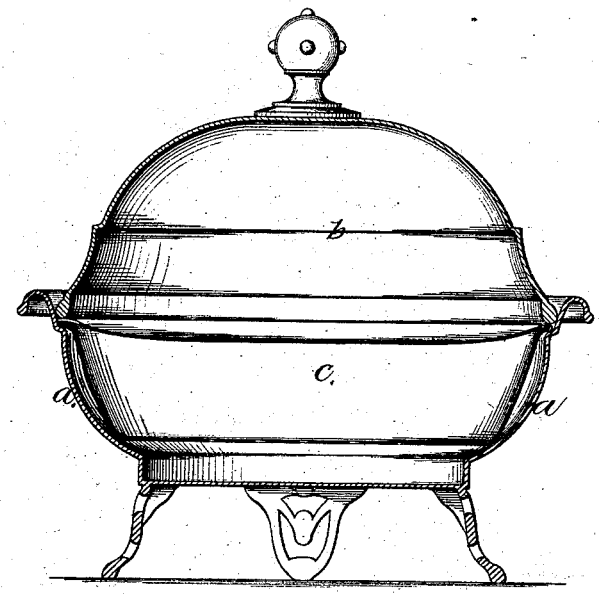

Figure 1 is a side elevation and sectional view of the dish and ice-holder in place.

In this figure, *a a* are the body of the dish; *b*, the cover; *c*, the ice-holder, with concave cover (butter-platform) and perforated bottom, having a water-chamber in the body of the dish, beneath, and air-spaces around the sides.

Figure 2:
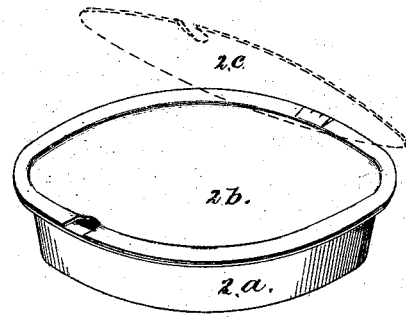

Fig. 2 shows the ice-holder and butter-platform, (cover,) the perforated bottom not being visible therein. 2*a* is the ice-holder; 2*b*, the cover and butter-platform, with hole to facilitate opening; and 2*c* shows the position of the cover partly raised.

I claim—

As a new article of manufacture, the butter-dish herein described, consisting of the vessel *a a* and cover *b*, and the removable ice-holder *c*, having a perforated bottom, and provided with a butter-platform, hinged or free, as and for the purpose set forth.

ALICE C. TOWNSEND.

Witnesses:
M. H. N. KENDIG,
ALMONT BARNES.